(12) United States Patent
Shrestha et al.

(10) Patent No.: US 12,082,098 B2
(45) Date of Patent: Sep. 3, 2024

(54) CELL IDENTITY FOR EARTH-FIXED AREA WITH A MOVING CELL

(71) Applicant: QUALCOMM Incorporated, San Diego, CA (US)

(72) Inventors: Bharat Shrestha, San Diego, CA (US); Umesh Phuyal, San Diego, CA (US); Mungal Singh Dhanda, Slough (GB); Prasad Reddy Kadiri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/339,758

(22) Filed: Jun. 4, 2021

(65) Prior Publication Data

US 2022/0030504 A1   Jan. 27, 2022

Related U.S. Application Data

(60) Provisional application No. 63/056,491, filed on Jul. 24, 2020.

(51) Int. Cl.
*H04W 60/00*     (2009.01)
*H04W 4/029*     (2018.01)
(Continued)

(52) U.S. Cl.
CPC .......... *H04W 48/10* (2013.01); *H04W 4/029* (2018.02); *H04W 60/00* (2013.01); *H04W 76/10* (2018.02)

(58) Field of Classification Search
CPC ..... H04W 48/10; H04W 4/029; H04W 60/00; H04W 76/10; H04W 48/20; H04W 84/06;
(Continued)

(56) References Cited

U.S. PATENT DOCUMENTS

| | | | |
|---|---|---|---|
| 2020/0145843 A1* | 5/2020 | Yang | H04W 24/02 |
| 2022/0007267 A1* | 1/2022 | Maattanen | H04W 8/26 |
| 2022/0264383 A1* | 8/2022 | Teyeb | H04W 36/0058 |

FOREIGN PATENT DOCUMENTS

WO    2020091647 A1    5/2020

OTHER PUBLICATIONS

3GPP TR 38.821: "3rd Generation Partnership Project; Technical Specification Group Radio Access Network; Solutions for NR to Support Non-Terrestrial Networks (NTN) (Release16)", 3GPP Standard, Technical Report, 3GPP TR 38.821, 3rd Generation Partnership Project (3GPP), Mobile Competence Centre, 650, Route Des Lucioles, F-06921 Sophia-Antipolis Cedex, France, vol. RAN WG3, No. V16.0.0 (Dec. 2019), Jan. 16, 2020 (Jan. 16, 2020), pp. 1-140, XP051860814, Retrieved from the Internet: URL: http://ftp.3gpp.org/Specs/archive/38_series/38.821/38821-g00.zip 38821-g00.doc [Retrieved on Jan. 16, 2020].

(Continued)

*Primary Examiner* — Marcus Hammonds
(74) *Attorney, Agent, or Firm* — Seyfarth Shaw LLP (57) ABSTRACT

A method for wireless communication performed by a user equipment (UE) identifies multiple cell global identities (CGIs) broadcast by a cell. The method also determines a current tracking area identity of the UE from multiple tracking area identities of the cell based on a rule. The rule may be based on a preconfigured or predefined rule. The method selects a first CGI of the CGIs based on the determined tracking area identity.

31 Claims, 5 Drawing Sheets

(51) Int. Cl.
*H04W 48/10* (2009.01)
*H04W 76/10* (2018.01)

(58) Field of Classification Search
CPC . H04W 60/005; H04W 84/005; H04W 48/12; H04W 24/02
See application file for complete search history.

(56) References Cited

OTHER PUBLICATIONS

International Search Report and Written Opinion—PCT/US2021/036229—ISA/EPO—Oct. 1, 2021.
Zte., et al., "Tracking Area Management and Paging Handling in NTN", 3GPP Draft, 3GPP TSG RAN WG3#103, R3-190139, 3rd Generation Partnership Project (3GPP), Athens, Greece, Feb. 25-Mar. 1, 2019, 13 Pages, XP051604086, Retrieved from the Internet: URL: http://www.3gpp.org/ftp/tsg%5Fran/WG3%5Flu/TSGR3%5F103/Docs/R3%2D190139%2Ezip [retrieved on Feb. 16, 2019].

* cited by examiner

CELL IDENTITY FOR EARTH-FIXED AREA WITH A MOVING CELL

CROSS-REFERENCE TO RELATED APPLICATION

The present application claims the benefit of U.S. Provisional Patent Application No. 63/056,491, filed on Jul. 24, 2020, and titled "CELL IDENTITY FOR EARTH-FIXED AREA WITH A MOVING CELL," the disclosure of which is expressly incorporated by reference in its entirety.

FIELD OF THE DISCLOSURE

Aspects of the present disclosure generally relate to wireless communications, and more particularly to techniques and apparatuses for cell identity with a moving cell.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband Internet of things (NB-IoT) and eMTC (enhanced-machine type communications) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

SUMMARY

In aspects of the present disclosure, a method for wireless communication performed is disclosed. The method includes identifying multiple cell global identities (CGIs) broadcast by a cell. In the present description, when discussing CGIs, E-UTRAN (evolved universal terrestrial access network) cell global identifiers (ECGIs) and future types of identifiers are also contemplated. The method includes determining a current tracking area identity of the UE from multiple tracking area identities of the cell based on a predefined or preconfigured rule. The method further includes selecting a first CGI of the multiple of CGIs based on the determined tracking area identity.

Other aspects of the present disclosure are directed to an apparatus including means for identifying multiple CGIs broadcast by a cell. The apparatus also includes means for determining a current tracking area identity of the UE from multiple tracking area identities of the cell based on a predefined or preconfigured rule. The apparatus further includes means for selecting a first CGI of the multiple of CGIs based on the determined tracking area identity.

In other aspects of the present disclosure, a non-transitory computer-readable medium with non-transitory program code recorded thereon is disclosed. The program code is for wireless communication performed. The program code is executed by a processor and includes program code to identify multiple CGIs broadcast by a cell. The program code also includes program code to determine a current tracking area identity of the UE from multiple tracking area identities of the cell based on a predefined or preconfigured rule. The program code further includes program code to select a first CGI of the multiple of CGIs based on the determined tracking area identity.

Other aspects of the present disclosure are directed to an apparatus having a memory, one or more processors coupled to the memory, and instructions stored in the memory. The instructions being operable, when executed by the processor, to cause the apparatus to identify multiple CGIs broadcast by a cell. The instructions also cause the apparatus to determine a current tracking area identity of the UE from multiple tracking area identities of the cell based on a predefined or preconfigured rule. The instructions additionally cause the apparatus to select a first CGI of the multiple of CGIs based on the determined tracking area identity.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A non-terrestrial network (NTN) may use one or more non-terrestrial entities, such as a satellite or a high-altitude platform (HAP) to provide wireless communication access to a user equipment (UE). The non-terrestrial entities may orbit the Earth or a region. Due to the continuous movement of non-terrestrial entities, a coverage area (e.g., cellular coverage area) of a non-terrestrial entity may change. Each non-terrestrial entity may provide a comparatively large coverage area. In some cases, multiple tracking areas may fall within a coverage area.

To reduce a paging load, a UE may not be registered for multiple tracking areas within a cell. Still, the UE may identify multiple tracking area codes (TACs) or CGIs associated with a cell (e.g., coverage area). Thus, it is desirable to configure a UE to manage a tracking area list in a moving cell to reduce unnecessary registration procedures.

According to aspects of the present disclosure, when performing a cell selection or reselection, a UE selects one of the multiple TACs (e.g., CGIs) and informs a satellite and/or a core network (CN) of the selection. The UE may transmit the information to the core network via an access network. The tracking areas may be Earth-fixed. In some configurations, a UE may determine a TAC based on a preconfigured or predefined rule. Examples of this rule include selecting based on the UE's determined location, a random selection, selecting multiple TACs, and selecting based on a timer, such as a time when the TAC is valid. According to aspects of the present disclosure, a UE selects one CGI from one or more CGIs of a cell based on a derived TAC. Additionally, according to aspects of the present disclosure, a core network may locate a UE by associating CGIs with Earth-fixed areas.

In some aspects, the UE may perform neighbor cell measurements, and obtain CGI information of the neighbor cell. If the neighbor cell includes multiple CGIs, the UE may report all of the CGIs or select a set of the CGIs. In some configurations, the UE reports multiple CGIs or tracking area codes for the neighbor cell together with a time of measurement. In other configurations, the UE reports the CGI or tracking area based on its geo-location/time according to a rule. For example, the UE may select the closest neighbor tracking area to the UE's current tracking area. In other configurations, the UE randomly selects one CGI of the neighbor cell and reports the randomly selected CGI with a measurement time. In still other configurations, the rule is based on a location of a satellite associated with the neighbor cell.

Figure 1:
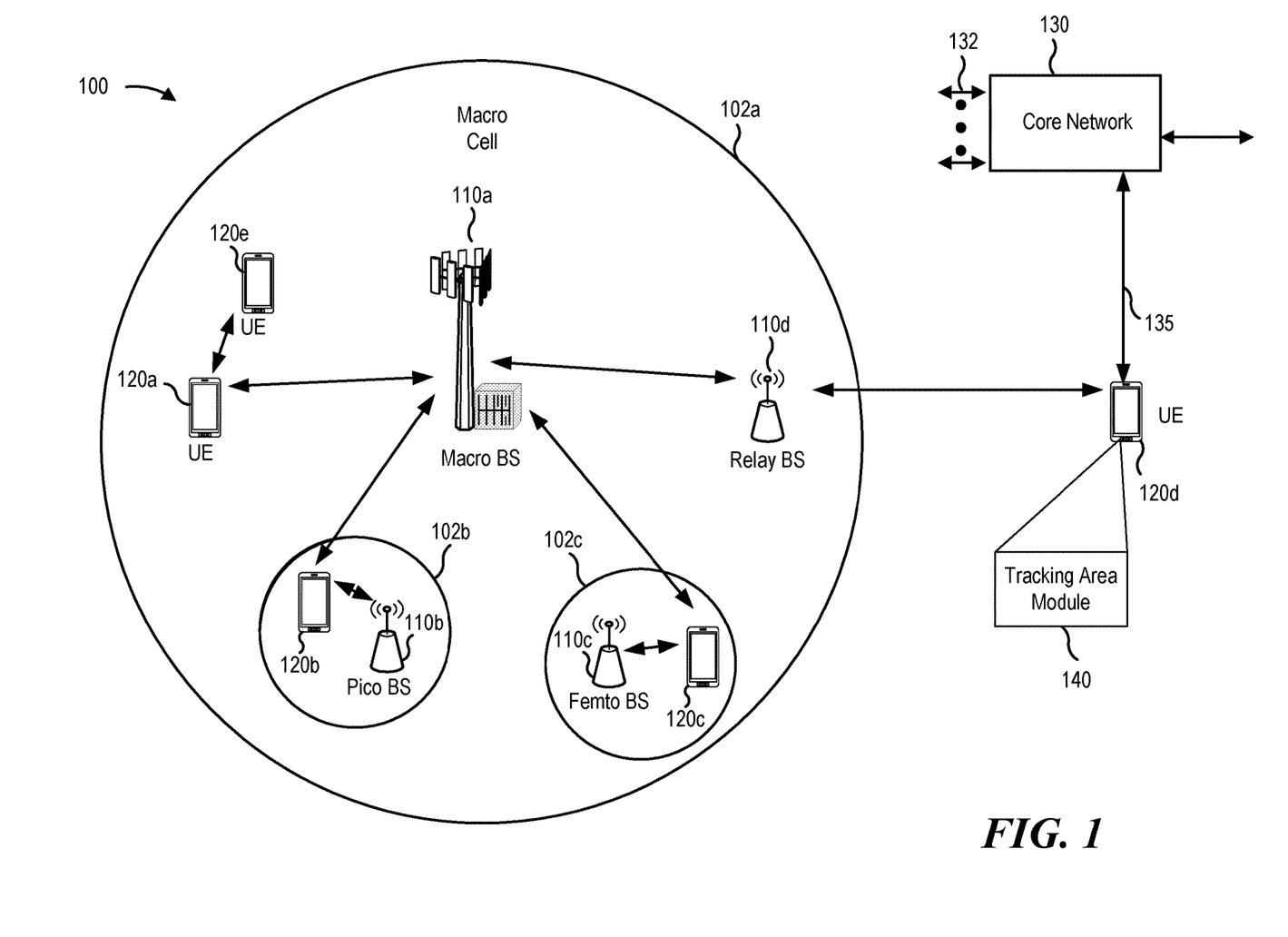
FIG. 1 is a block diagram conceptually illustrating an example of a wireless communications network, in accordance with various aspects of the present disclosure.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

As an example, the BSs 110 (shown as BS 110a, BS 110b, BS 110c, and BS 110d) and the core network 130 may exchange communications via backhaul links 132 (e.g., S1, etc.). Base stations 110 may communicate with one another over other backhaul links (e.g., X2, etc.) either directly or indirectly (e.g., through core network 130). The UEs 120 (e.g., 120a, 120b, 120c) may communicate with the core network 130 through a communication link 135. The communication link 135 passes through an access network (not shown in FIG. 1). The access network may facilitate communications between the core network 130 and the UE 120.

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (e.g., S1, S2, etc.) and may perform radio configuration and scheduling for communications with the UEs 120. In some configurations, various functions of each access network entity or base station 110 may be distributed across various network devices (e.g., radio heads and access network controllers) or consolidated into a single network device (e.g., a base station 110).

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a packet data unit (PDU) session for a network slice. In some cases, the UE 120 may select a network slice based on an application or subscription service. By having different network slices serving different applications or subscriptions, the UE 120 may improve its resource utilization in the wireless communications system 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include a tracking area module 140. For brevity, only one UE 120d is shown as including the tracking area module 140. The tracking area module 140 may identify a number of CGIs broadcast by a cell. The tracking area module 140 may also determine a current tracking area identity of the UE from a number of tracking area identities of the cell based on a predefined or preconfigured rule. The tracking area module 140 may further select a first CGI of the plurality of CGIs based on the current tracking area identity.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
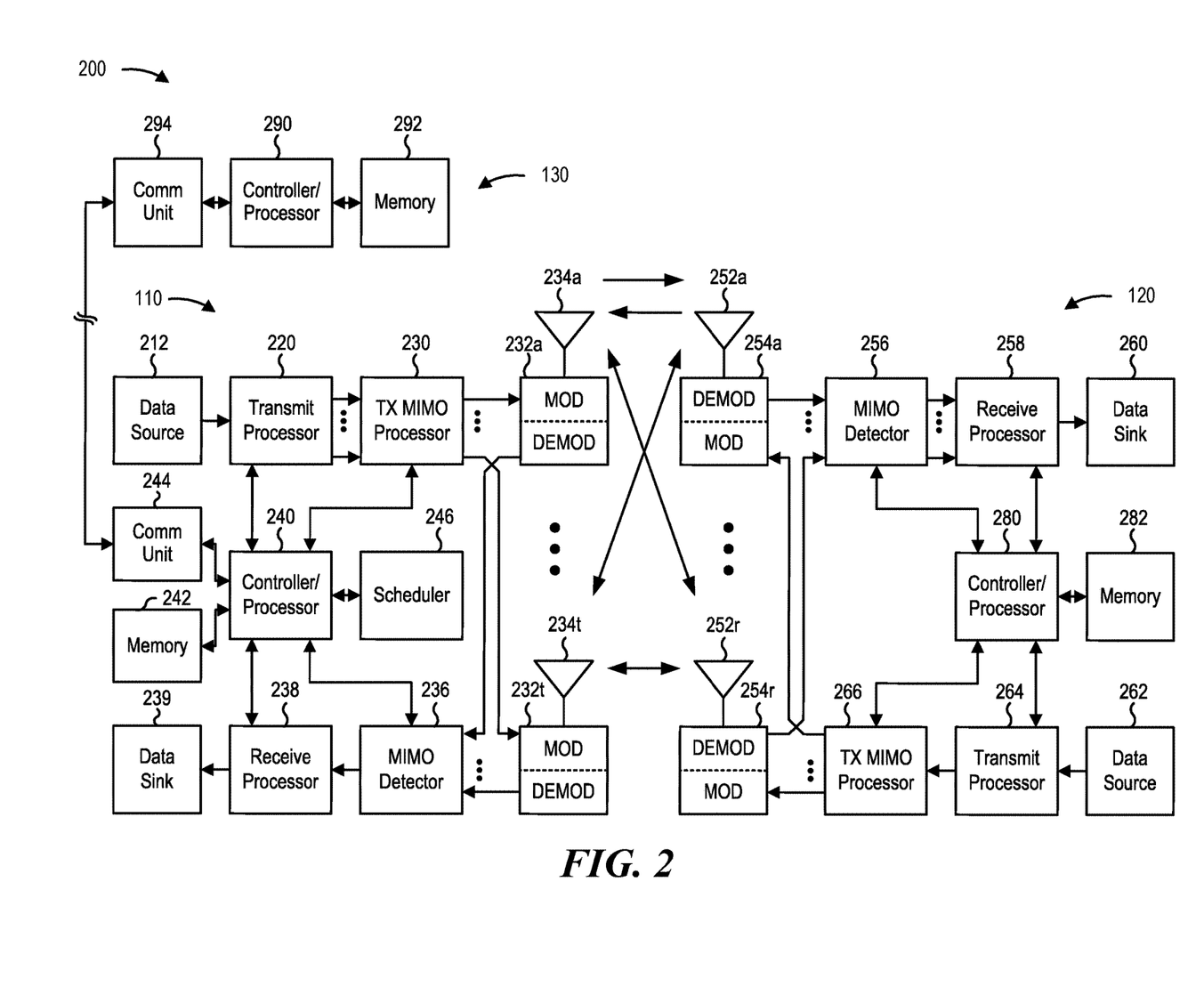
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor the controller/processor 280 of the UE 120, and/or any other component(s) of FIG. 2 may perform one or more techniques associated with cell selection, cell reselection, and registration as described in more detail elsewhere. For example, the controller/processor 280 of the UE 120, and/or any other component(s) of FIG. 2 may perform or direct operations of, for example, the process of FIG. 5 and/or other processes as described. Memory 282 may store data and program codes for the UE 120. A scheduler 246 may schedule UEs for data transmission on the downlink and/or uplink.

In some aspects, the UE 120 may include means for identifying a number of cell global identities (CGIs) broadcast by a cell, means for determining a current tracking area identity of the UE from a number of tracking area identities of the cell based on a current location of the UE, and means for selecting a first CGI of the plurality of CGIs based on the current tracking area identity. Such means may include one or more components of the UE 120 described in connection with FIG. 2.

As indicated above, FIG. 2 is provided merely as an example. Other examples may differ from what is described with regard to FIG. 2.

A non-terrestrial network (NTN) may include one or more non-terrestrial entities, such as a satellite or a high-altitude platform (HAP), to provide wireless communication access to a user equipment (UE). The non-terrestrial entities may orbit the Earth or a region. Due to the continuous movement of non-terrestrial entities, a coverage area (e.g., cellular coverage area) of a non-terrestrial entity may change. Each non-terrestrial entity may provide a comparatively large coverage area. In some cases, multiple tracking areas may fall within a coverage area. A tracking area is an area to which the network transmits a page for a device, such as a user equipment (UE). Multiple cells are grouped into each tracking area. For ease of explanation, the coverage area may be referred to as a cell. Additionally, the non-terrestrial entity may be referred to as a satellite. Other types of non-terrestrial entities are contemplated.

A user equipment (UE) may be stationary or the UE's movement may be limited. Additionally, the UE may identify multiple tracking area codes (TAC) or CGIs associated with a cell. To reduce a paging load, a UE may not be registered for multiple tracking areas within a cell. Thus, it is desirable to configure a UE to manage a tracking area list in a moving cell to reduce unnecessary registration procedures. In some cases, a UE may initiate a registration procedure if a tracking area of a current cell is not included in a tracking area list of the UE.

Figure 3:
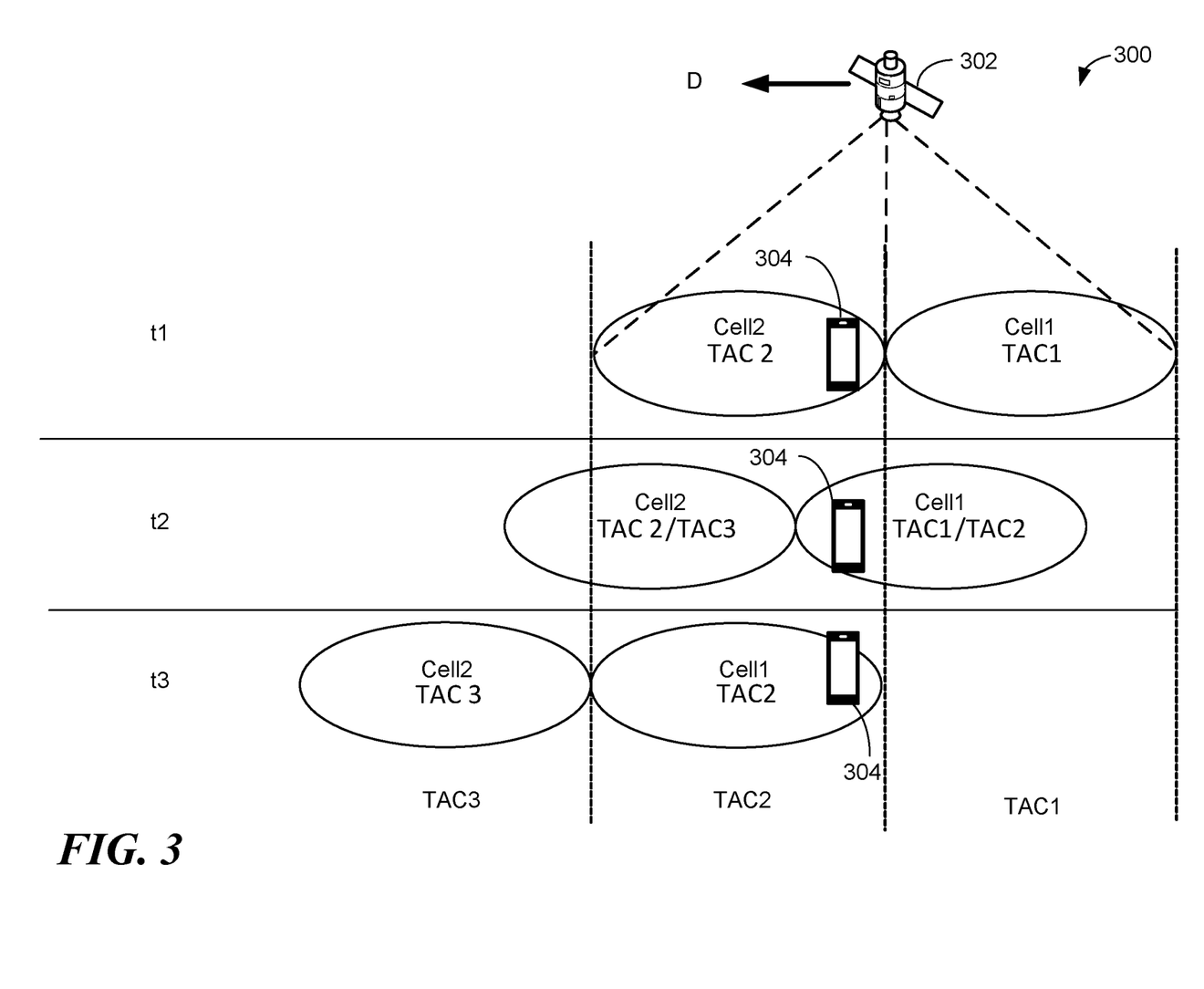
FIG. 3 is a diagram illustrating an example of non-terrestrial networks (NTNs) with Earth-fixed tracking areas, in accordance with aspects of the present disclosure.

FIG. 3 is a diagram illustrating an example of a non-terrestrial network (NTN) 300 with Earth-fixed tracking areas, in accordance with aspects of the present disclosure. As shown in FIG. 3, a satellite 302 (e.g., non-terrestrial entity) moves in a direction (D). The satellite 302 provides coverage via two different cells (shown as cell 1 and cell 2). Each cell represents coverage of a beam of the satellite 302.

In the example of FIG. 3, multiple Earth-fixed tracking areas are defined. That is, each tracking area corresponds to a spatial area. Additionally, each tracking area may be associated with a TAC (shown as TAC1, TAC2, and TAC3). A cell group identity may be associated with each TAC. A UE 304 is located in a second tracking area (TAC2) near a border of the second tracking area (TAC2) and a first tracking area (TAC1).

In the example of FIG. 3, at time t1, cell 1 is completely located within the first tracking area and cell two is completely located within the second tracking area. Thus, at time t1, cell 1 broadcasts TAC1 and cell 2 broadcasts TAC2. Additionally, at time t1, the UE 304 is located within cell 2. Because cell 2 only broadcasts TAC2 at time t1, the UE 304 selects TAC2 (e.g., a cell global identity associated with TAC2) and notifies the satellite 302 that it is served by cell 2. In response, the satellite 302 broadcasts paging notifications corresponding to TAC2.

Still, a cell may broadcast multiple tracking area codes (e.g., tracking area identities) when it covers multiple tracking areas. For example, as the satellite 302 moves, at time t2, cell 1 is located within the first and second tracking areas and cell two is located within the second and third tracking areas. Additionally, at time t2, the UE 304 is now located within cell 1, which broadcasts TAC1 and TAC2. Because cell 1 broadcasts TAC1 and TAC2, the satellite 302 may broadcast paging notifications for both TAC1 and TAC2, thus causing a UE in the first tracking area to receive paging notifications for the second tracking area, and vice versa. In one example, the first tracking area may be located in one country and the second tracking area may be located in another country. Therefore, it may be undesirable for the UE 304 in the second tracking area to receive paging notifications for the first tracking area.

According to aspects of the present disclosure, when performing a cell selection or reselection, the UE 304 selects one of the multiple TACs (e.g., CGIs) and informs the satellite 302 and/or a core network (not shown in FIG. 3) of the selection. The UE 304 may transmit the information to the core network via an access network (not shown in FIG. 3). In the example of FIG. 3, at time t3, cell 1 broadcasts TAC2 and cell 2 broadcasts TAC3 because cell 1 is completely within the second tracking area (TAC2) and cell 2 is located within the third tracking area (TAC3).

As described, the tracking areas may be Earth-fixed. As such, small tracking areas may lead to increased tracking area update (TAU) signaling for a UE, such as the UE 304 described with respect to FIG. 3, at the boundary between two tracking areas. Wide tracking areas may increase a paging load within a cell (e.g., coverage of a satellite beam). In some configurations, a UE may determine its location and derive a tracking area code (TAC) based on the UE's determined location. According to aspects of the present disclosure, a UE selects one CGI from one or more CGIs of a cell based on a derived TAC. Additionally, according to aspects of the present disclosure, a core network may locate a UE by associating CGIs with Earth-fixed areas.

Figure 4:
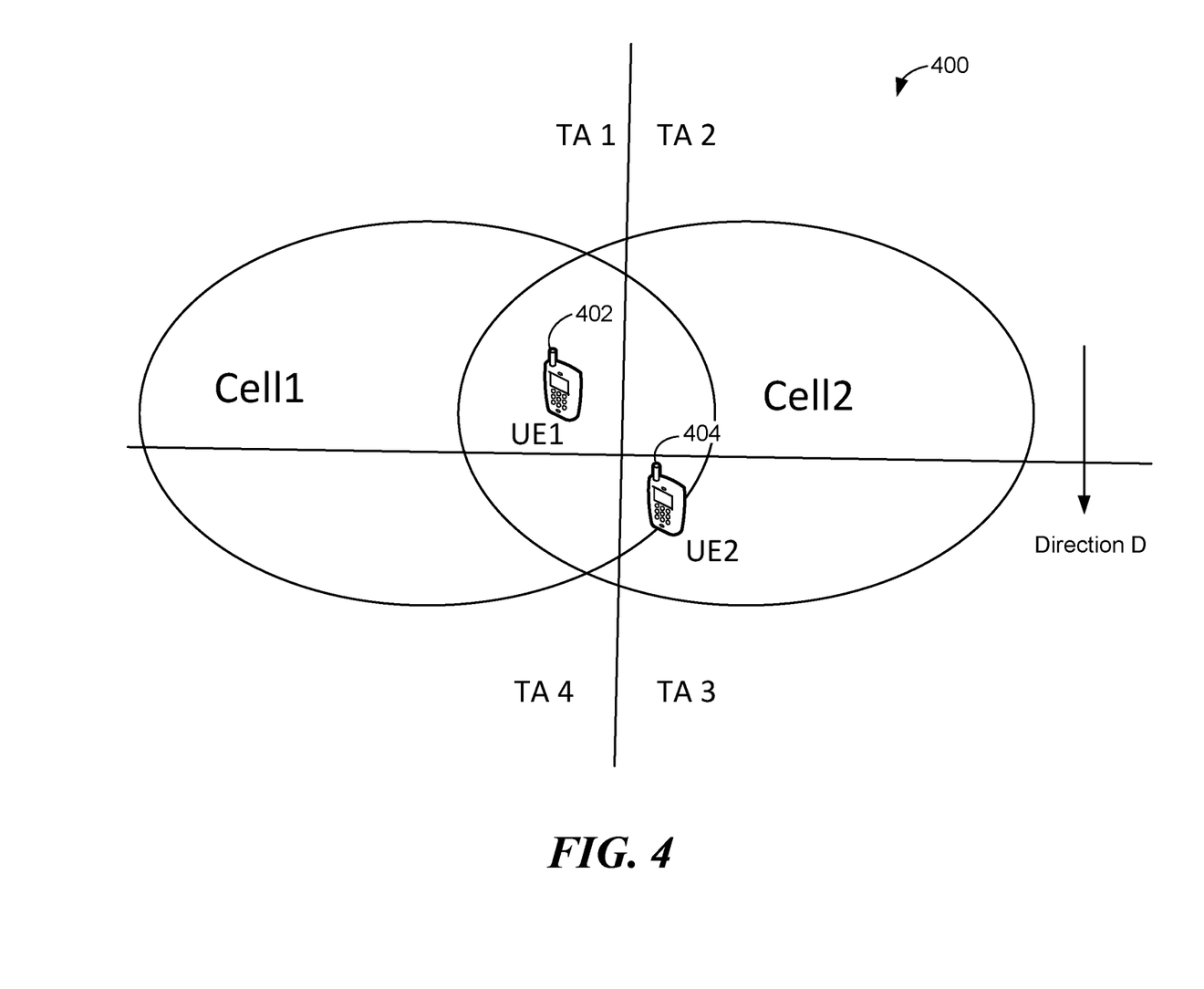
FIG. 4 is a diagram illustrating another example of non-terrestrial networks (NTNs) with Earth-fixed tracking areas, in accordance with aspects of the present disclosure.

As described above, in an Earth-fixed tracking area, a UE may determine a tracking area identity (e.g., tracking area code) to select based on its location. In the current description, the tracking area code may be referred to as the tracking area identity. FIG. 4 is a diagram illustrating an example of a non-terrestrial network (NTN) 400 with Earth-fixed tracking areas, in accordance with aspects of the present disclosure. As shown in FIG. 4, the cells (shown as cell 1 and cell 2 in FIG. 4) move in a direction (D) and cover a first area associated with a first tracking area code (shown as TA1 in FIG. 4), a second area associated with a second tracking area code (shown as TA2 in FIG. 4), a third area associated with a third tracking area code (shown as TA3 in FIG. 4), and a fourth area associated with a fourth tracking area code (shown as TA4 in FIG. 4). Each cell (cell 1 and cell 2) corresponds to a footprint of a satellite beam. In some cases, two or more cells may overlap. Still, each cell may be designated to serve one or more locations that are different from the location(s) served by the other overlapping cell(s).

In the example of FIG. 4, cell 1 is intended to cover TA1 and TA4, and cell 2 is intended to cover TA2 and TA3. Because cell 1 and cell 2 represent the footprints of different satellite beams, cell 1 corresponds to a public land mobile network (PLMN) identifier (ID) that is different from the PLMN ID of cell 2. For example, cell 1 corresponds to a first PLMN ID (e.g., PLMN1) and cell 2 corresponds to a second PLMN ID (e.g., PLMN2).

As described, a CGI may be determined from a tracking area code. More specifically, the CGI may be determined based on a public land mobile network (PLMN) ID, the tracking area code, a physical cell identifier (PCI) and/or a cell ID. Because each cell in FIG. 4 serves two tracking areas, each cell may broadcast two different CGIs. For example, cell 1 may broadcast CGI1 (e.g., CGI1=PLMN1+ TA1+cell 1) and CGI4 (e.g., CGI1=PLMN1+TA4+cell 1). Additionally, cell 2 may broadcast CGI2 (e.g., CGI2=PLMN2+TA2+cell 2) and CGI3 (e.g., CGI3=PLMN2+TA3+cell 2). The equations described above are provided for ease of explanation, the cell global identity is not limited to the sum of the PLMN ID, tracking area code, and cell ID. Rather, the cell global identity may be a function of the PLMN ID, the tracking area code, the cell ID, and/or other elements.

As described above, for a cell, such as cell 1, the cell ID and PLMN ID are constants, and the tracking area code may be a variable. Therefore, selecting one CGI from multiple CGIs broadcast by a cell may correspond to selecting a tracking area code from multiple tracking area codes within a footprint of the cell.

In the example of FIG. 4, a UE 402 may be in an idle or inactive mode. When in idle or inactive mode, the UE 402 (shown as UE1 in FIG. 4) monitors a serving cell and neighbor cells to select a cell based on a cell reselection rule. For example, the UE 402 may select a cell with a highest received signal strength. In FIG. 4, another UE 404 (shown as UE2 in FIG. 4) may be located in TA3. For brevity, the current disclosure will be described with reference to the UE 402 located in TA1.

In the example of FIG. 4, the UE 402 is located in TA1, which is covered by both cell 1 and cell 2. Still, as described, cell 2 is intended to serve TA2 and TA3, while cell 1 is intended to serve TA1 and TA4. Therefore, the UE 402 should select cell 1, rather than cell 2. In one configuration, based on its geo-location, the UE 402 determines it should select cell 1, rather than cell 2. In this configuration, the UE 402 determines its geo-location based on one or more location sensors. From the determined location, the UE 402 determines it is in TA1. That is, the UE 402 maps a tracking area based on the UE's determined location. After determining it is in TA1, the UE 402 may select a cell, such as cell 1, and identify a corresponding CGI based on the CGIs broadcast from the selected cell. If the broadcast CGI corresponds to the determined tracking area, the UE 402 selects the corresponding CGI. If the CGI does not correspond to the determined tracking area, the UE 402 continues its search. In this example, the UE 402 determines it belongs to CGI1 of cell 1 because CGI1 corresponds to TA1 (e.g., CGI1=PLMN1+TA1+cell 1).

In some configurations, each cell broadcasts a list of tracking areas (e.g., tracking area codes). The list of tracking areas identifies tracking areas served by the PLMN ID at a previous time, current time, and/or a future time. When the UE 402 identifies its current tracking area, the UE 402 should determine whether the identified tracking area is included in the tracking area list broadcast by the selected cell. The UE 402 may select a cell if the UE 402 is registered for the cell's PLMN ID and if the UE's tracking area is included in the list of tracking areas of the cell. The UE 402 may select a cell if a tracking area identity corresponding to the first CGI matches a last used or registered tracking area identity.

For example, in FIG. 4, when selecting cell 1, the UE 402 first determines if the PLMN ID (e.g., PLMN1) of cell 1 is a registered or allowed PLMN for the UE 402. If the PLMN ID is allowed, the UE 402 then determines if the tracking area code (e.g., tracking area identity) broadcast by cell 1 matches the tracking area code determined by the UE 402 based on the UE's location.

In some cases, after identifying the cell to select, the UE 402 may fail to connect to the selected cell. In the example of FIG. 4, the UE 402 determines it should select cell 1 based on the tracking area code broadcast by cell 1 matching the tracking area code determined by the UE 402 based on the UE's location. Still, after selecting cell 1, the UE 402 may fail to connect to cell 1. For example, a received signal strength of cell 1 may be below an allowed received signal strength threshold. In this example, the received signal strength of cell 2 may be equal to or greater than the allowed received signal strength threshold. Therefore, the UE 402 may select cell 2.

In this example, after selecting cell 2 and reading the system information, the UE 402 may determine that it is not registered to access cell 2. That is, the UE 402 may not be registered to access TA2 or TA3. At the current time, the UE 402 may be barred from selecting cell 2 and may select cell 1. Still, the UE 402 may perform a registration update to access cell 2 after the bar is removed (e.g., relaxed). The bar may be removed after a period of time. The UE 402 may then select cell 2.

According to aspects of the present disclosure, the UE 402 may perform a registration update if a tracking area code determined by the UE 402 is not in a list of tracking area codes allowed for the UE 402. The list of allowed tracking area codes may be stored by the UE 402. For example, the UE 402 may map its current location to TA4. However, TA4 may not be in a list of allowed tracking area codes stored at the UE 402. Therefore, the UE 402 may perform a registration update.

Additionally, or alternatively, the UE 402 may perform a registration update if a selected cell does not broadcast a tracking identity code included in the list of allowed tracking identity codes stored at the UE 402. For example, TA2 and TA3 may not be included in the list of allowed tracking identity codes stored at the UE 402. Therefore, the UE 402 would perform a registration update if the UE 402 selected cell 2. The UE 402 may also perform a registration update if a periodic registration update timer expires.

Additionally, in some configurations, the UE 402 measures a received signal strength of one or more cells of a terrestrial network (not shown in FIG. 4). The current location of the UE 402 or the CGI1 of cell 1 may correspond to a fixed cell of the terrestrial network. The UE 402 may report a CGI of a cell of the set of cells with a highest received signal strength during a radio resource control (RRC) setup procedure or in response to a network request. The CGI of the terrestrial network may be used by a core network or radio access network (RAN) for various services (e.g., regulatory service and paging) that use the UE's location.

After completing the cell selection process or cell reselection process, the UE 402 monitors paging on the selected cell. As shown in FIG. 4, cell 1 and cell 2 may be moving in the direction D. Therefore, after selecting, or reselecting, cell 1 or cell 2, the UE 402 may have a different CGI in comparison to a previous CGI. In some configurations, the UE 402 does not read the system information block (SIB) of a new cell to determine the CGI change. The UE 402 may be configured to determine the CGI based on time as cells move. In some configurations, based on a physical cell ID of the selected cell, the UE 402 may determine the CGI, or the PLMN (mobile country code (MCC)+mobile network code (MNC)), and a tracking area code. The UE 402 may also be configured to know movement information of different satellites.

That is, the UE 402 may identify a physical cell ID, beam ID, or beam frequency based on a current time and the UE's current location. Additionally, based on satellite tracking information, the UE's current location, the current time, and/or the physical cell ID, the UE 402 may know which PLMN and tracking area identity is broadcast by a cell. If the UE 402 does not obtain information for a physical cell ID, beam ID, or beam frequency, the UE 402 acquires the system information to read the CGI for the selected cell.

The UE 402 may transmit a connection request message to a core network to perform a registration update or to enter a connected mode. For example, the UE 402 may transmit a connection request for cell 1. Still, the core network may not know whether the UE 402 is in TA1 or TA4. In some configurations, the UE 402 transmits the mapped tracking area code to the core network in the connection request message. For example, if the UE 402 is in TA1, the connection request message includes an indication that UE 402 is in TA1.

From the point of view of the core network, the CGI remains the same for a given Earth-fixed area. From a cell point-of-view, the CGI may change as the cell moves and the cell may cover multiple Earth-fixed areas, in which case the cell broadcasts multiple CGIs. If a cell broadcasts multiple CGIs, such as cell 1 broadcasting CGI1 and CGI4, the UE 402 selects one of the CGIs based on a predefined rule. In one example, the UE 402 selects the CGI based on the UE's current geo-location. The UE 402 may be configured with a rule for mapping the CGI, or tracking area code, to the UE's geo-location. The geo-location may be location information, UE 402 may not provide the CGI during a setup procedure. Alternatively, the UE 402 may randomly select one CGI from the list broadcast in the cell. The randomly selected CGI may be transmitted during the setup procedure or in response to a network request. In other examples, the UE 402 reports multiple CGIs during the setup procedure or in response to the network request. The UE may transmit a selected CGI based on a last used CGI during the RRC setup procedure or in response to a network request. In some configurations, when the UE 402 cannot determine a unique mapping between the CGI (e.g., tracking area code) and the UE's geo-location, the UE 402 enters a connected mode, and a radio access network (RAN) determines the UE's location (e.g., based on the UE's reported position or network based positioning procedure). The network may then provide the UE 402 with the mapping information between the CGI and the UE's geo-location.

As described, a cell may broadcast a list of tracking area identities for current cell coverage and future cell coverage. Alternatively, the cell broadcasts a list of tracking area identities (e.g., including past, current, and future) and updates the list only when the UE 402 enters a new tracking area, which is not in the list. The cell provides an indication that one or multiple target area codes belong to the current cell.

TABLE 1 provides an example of information elements that may be provided as system information, such as in a system information block (SIB) or SIB1, broadcast to the UE 402. In TABLE 1, trackingAreaCode may be updated as a cell moves. A change in the trackingAreaCode in the system information does not trigger the system information update procedure. However, the list trackingAreaCodeListExt-r17 remains the same for a period of time.

TABLE 1

```
PLMN-IdentityInfoList :: =              SEQUENCE (SIZE(1..maxPLMN)) OF PLMN-IdentityInfo
PLMN-IdentityInfoList-v17xy :: =           SEQUENCE (SIZE(1..maxPLMN)) OF PLMN-IdentityInfo-v17xy
PLMN-IdentityInfo :: =                  SEQUENCE {
   plmn-IdentityList                      SEQUENCE (SIZE(1..maxPLMN)) OF PLMN-Identity,
   trackingAreaCode                       TrackingAreaCode        OPTIONAL, -- Need R
   ranac                                  RAN-AreaCode            OPTIONAL, -- Need R
   cellIdentity                           CellIdentity
   cellReservedForOperatorUse             ENUMERSTED {reserved, notReserved}
   ...,
   [[
   iab-Support-r16                        ENUMERATED{true}        OPTIONAL -- Need R
   ]]
}
PLMN-IdentityInfoList-v17xy :: =         SEQUENCE {
   cellIdentityListExt-r17                   SEQUENCE (SIZE(1.. maxTA)) OF CellIdentity OPTIONAL, -- Need R
   trackingAreaCodeList-r17                  SEQUENCE (SIZE(1.. maxTA)) OF TrackingAreaCode OPTIONAL, -- Need R
   ranacList-r17                             SEQUENCE (SIZE(1.. maxTA)) OF RAN-AreaCode OPTIONAL, -- Need R
}
``` such an a distance between the UE and a reference point. In other configurations, the location information may be a distance from an area of UE presence to a reference point.

As described, from the registration update message (e.g., connection request message), the core network should know the UE's corresponding tracking area because a cell may cover multiple tracking areas. The UE 402 may indicate its current tracking area (e.g., TA1), or CGI (e.g., CGI1), in a non-access stratum (NAS) registration update message. Alternatively, the UE 402 may include selected cell information (e.g., tracking area code and cell identity) during a radio resource control (RRC) setup procedure or in response to a network request.

If the UE 402 cannot determine the mapping between the CGI (e.g., tracking area code) and the UE's geo-location, the A described, the UE 402 may be configured to know a time when a cell will cover a tracking area. A non-access stratum (NAS) message may provide the timing information for coverage of a tracking area when the UE 402 is in a connected mode, such as the RRC CONNECTED mode. Additionally, or alternatively, the timing information for coverage of a tracking area may be broadcast in the system information or a dedicated radio resource control (RRC) message.

In some configurations, a tracking area list may correspond to a validity timer. The UE 402 may acquire a system information block (SIB) after expiration of the validity timer. When the UE 402 acquires a SIB, such as SIB1, the UE 402 may identify the global cell identities of a cell it belongs to over the course of time. That is, a list of cells (e.g., physical cell IDs) that share a common SIB1 may be provided. During cell reselection, the UE 402 may acquire a synchronization signal block (SSB) of a cell rather than the SIB. The validity timer may be a validity time period for a tracking area received from a non-access stratum (NAS) message, a dedicated RRC message, or a broadcast message.

In the example of FIG. 4, the UE 402 may perform neighbor cell measurements, such as measurements of cell 2, and obtain CGI information of the neighbor cell, such as CGI2 and CGI3. If the neighbor cell includes multiple CGIs, the UE 402 may report all of the CGIs or select a set of the CGIs. In some configurations, the UE 402 reports multiple CGIs or tracking area codes for the neighbor cell together with a time of measurement. In other configurations, the UE 402 reports the CGI or tracking area based on its geo-location/time according to a rule. For example, the UE 402 may select the closest neighbor tracking area to the UE's current tracking area. In other configurations, the UE 402 randomly selects one CGI of the neighbor cell and reports the randomly selected CGI with a measurement time. In still other configurations, the rule is based on a location of a satellite associated with the neighbor cell.

As indicated above, FIGS. 3-4 are provided as examples. Other examples may differ from what is described with respect to FIGS. 3-4.

Figure 5:
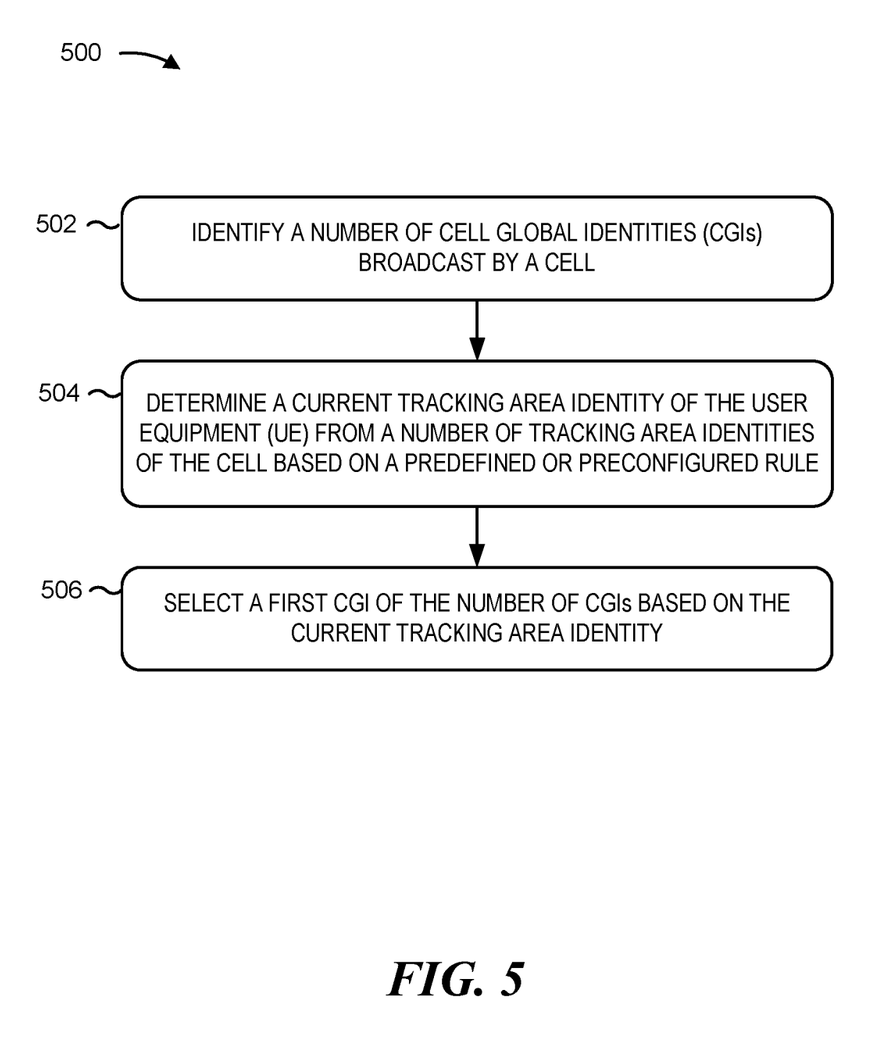
FIG. 5 is a flow diagram illustrating an example process performed, for example, by a user equipment, in accordance with various aspects of the present disclosure.

FIG. 5 is a flow diagram illustrating an example process 500 performed, for example, by a user equipment (UE), in accordance with various aspects of the present disclosure. The UE may be a UE 120 as described with respect to FIG. 1. The example process 500 is an example of selecting a cell identity for an Earth-fixed area with a moving cell.

As shown in FIG. 5, in some aspects, the process 500 may include identifying a number of CGIs broadcast by a cell (block 502). For example, the UE (e.g., using the antenna 252, DEMOD/MOD 254, MIMO detector 255, receive processor 258, controller/processor 280, and/or memory 282) can identify a number of CGIs broadcast by a cell. Each of the CGIs is based at least in part on one of the plurality of tracking area identities, a cell identifier (CID), a physical cell identifier (PCID), and/or a public land mobile network (PLMN) ID. The UE may receive the CGIs during a neighbor cell measurement. In some configurations, the UE may report the measurement of the neighbor cell including a time of reception of each of the CGIs of the neighbor cell, and at least one of the CGIs of the neighbor cell selected based on a neighbor rule. The neighbor rule may be based on a current location of the UE, or a location of a satellite associated with the neighbor cell, or a random number.

As shown in FIG. 5, in some aspects, the process 500 may include determining a current tracking area identity of the UE from a number of tracking area identities of the cell based on a predefined or preconfigured rule (block 504). For example, the UE (e.g., using the antenna 252, DEMOD/MOD 254, MIMO detector 256, receive processor 258, controller/processor 280, and/or memory 282) can determine a current tracking identity of the UE from a number of tracking area identities of the cell. The preconfigured rule may be based on a time period as the cell moves. In other aspects, the preconfigured rule may be pre-configured timing information for at least one of the tracking area identities and a public land mobile network (PLMN) identifier (ID) broadcast by the cell. In still other configurations, the preconfigured rule may be based on a mapping between current location information of the UE and the first CGI or a tracking area identity associated with the first CGI. In other configurations, the preconfigured rule is based on timing information identifying a time period when the cell will cover a tracking area. The timing information may be received in a non-access stratum (NAS) message, a dedicated radio resource control (RRC) message, or a broadcast message.

In some aspects, the process 500 may include selecting a first CGI of the number of CGIs based on the current tracking area identity (block 506). For example, the UE (e.g., using the antenna 252, DEMOD/MOD 254, TX MIMO processor 266, transmit processor 264, controller/processor 280, and/or memory 282) can select a first CGI of the number of CGIs based on the current tracking area identity. The UE may selecting the first CGI in response to determining that a public land mobile network (PLMN) identifier (ID) of the first CGI is a registered PLMN ID or an allowed PLMN ID, and a tracking area identity corresponding to the first CGI matches a last used or registered tracking area identity.

Implementation examples are described in the following numbered clauses.

1. A method for wireless communication performed by a user equipment (UE), comprising:
   identifying a plurality of cell global identities (CGIs) broadcast by a cell; determining a current tracking area identity of the UE from a plurality of tracking area identities of the cell based on a preconfigured rule; and
   selecting a first CGI of the plurality of CGIs based on the determined tracking area identity.
2. The method of clause 1, in which each CGI of the plurality of CGIs is based at least in part on one of the plurality of tracking area identities, a cell identifier (CID), a physical cell identifier (PCID), and/or a public land mobile network (PLMN) ID.
3. The method of clause 1 or 2, further comprising selecting the first CGI of the plurality of CGIs in response to determining that a public land mobile network (PLMN) identifier (ID) of the first CGI is a registered PLMN ID or an allowed PLMN ID, and a tracking area identity corresponding to the first CGI matches a last used or registered tracking area identity.
4. The method of any of the preceding clauses, further comprising performing a registration update in response to determining that a tracking area identity list of the cell does not include a registered tracking area identity, or a tracking area identity corresponding to the first CGI does not match the registered tracking area identity.
5. The method of any of the preceding clauses, in which the first CGI is barred for a period of time in response to the first CGI not matching a registered tracking area identity, and the method further comprises:
   selecting the first CGI of the plurality of CGIs after the period of time expires; and
   performing a registration update after selecting the first CGI.
6. The method of any of the preceding clauses, in which the preconfigured rule is based on a time period as the cell moves.
7. The method of any of the preceding clauses, further comprising determining, for cell reselection or cell selection, the first CGI is different from a previously selected CGI based on:
   a physical cell identifier (ID); and at least the first CGI or a public land mobile network (PLMN) ID and a tracking area identity associated with the first CGI determined based on the physical cell ID.
8. The method of any of the preceding clauses, in which the UE is pre-configured to select a physical cell identifier (ID), beam ID, or beam frequency at a given time period.
9. The method of any of the preceding clauses, in which the preconfigured rule comprises pre-configured timing information for at least one of the plurality of tracking area identities and a public land mobile network (PLMN) identifier (ID) broadcast by the cell.
10. The method of any of the preceding clauses, further comprising acquiring system information from the cell to read the first CGI prior to when the first CGI is selected during a cell reselection procedure.
11. The method of any of the preceding clauses, in which the preconfigured rule is based on a mapping between current location information of the UE and the first CGI or a tracking area identity associated with the first CGI.
12. The method of any of the preceding clauses, in which the current location information of the UE further comprising a distance from the UE to a reference point or a distance between an area of UE presence and an area of the reference point.
13. The method of any of the preceding clauses, further comprising:
transmitting the current tracking area identity in a registration update message included in a non-access stratum (NAS) message; or
transmitting the current tracking area identity during a radio resource configuration (RRC) setup procedure or in response to a network request.
14. The method of any of the preceding clauses, further comprising failing to map the first CGI to a current location of the UE, and in response to the failing to map, performing at least one of:
excluding the first CGI during a radio resource configuration (RRC) setup procedure;
transmitting a randomly selected CGI during the RRC setup procedure or in response to a network request,
transmitting a selected CGI based on a last used CGI during the RRC setup procedure or in response to the network request; and
reporting multiple CGIs during the RRC setup procedure or in response to the network request.
15. The method of any of the preceding clauses, further comprising:
receiving a list of tracking area identities for current cell coverage and future cell coverage; and
receiving an indication identifying a tracking area identity for the current cell coverage.
16. The method of any of the preceding clauses, in which the preconfigured rule is based on timing information identifying a time period when the cell will cover a tracking area, in which the timing information is received in a non-access stratum (NAS) message, a dedicated radio resource control (RRC) message, or a broadcast message.
17. The method of any of the preceding clauses, further comprising:
receiving a validity time period for a tracking area from a non-access stratum (NAS) message, a dedicated radio resource control (RRC) message or a broadcast message; and
acquiring a system information block (SIB) outside of the validity time period.
18. The method of any of the preceding clauses, further comprising:
receiving the plurality of CGIs during a measurement of a neighbor cell; and
reporting the measurement of the neighbor cell including a time of reception of each of the plurality of CGIs of the neighbor cell, and at least one CGI of the plurality of CGIs of the neighbor cell selected based on a neighbor rule.
19. The method of any of the preceding clauses, in which the neighbor rule is based on a current location of the UE, or a location of a satellite associated with the neighbor cell, or a random number.
20. The method of any of the preceding clauses, in which the cell corresponds to a coverage area of a non-terrestrial entity.
21. The method of any of the preceding clauses, in which a current location of the UE or the first CGI is associated with a fixed cell of a terrestrial network, and the method further comprises:
measuring a received signal strength of a set of cells of the terrestrial network or a non-terrestrial network; and
reporting the selected first CGI of a cell of the set of cells with a highest received signal strength during a radio resource control (RRC) setup procedure or in response to a network request.
22. An apparatus for wireless communications performed by a user equipment (UE), comprising:
a processor;
memory coupled with the processor; and
instructions stored in the memory and operable, when executed by the processor, to cause the apparatus:
to identify a plurality of cell global identities (CGIs) broadcast by a cell;
to determine a current tracking area identity of the UE from a plurality of tracking area identities of the cell based on a preconfigured rule; and
to select a first CGI of the plurality of CGIs based on the determined tracking area identity.
23. The apparatus of clause 22, in which each CGI of the plurality of CGIs is based at least in part on one of the plurality of tracking area identities, a cell identifier (CID), a physical cell identifier (PCID), and/or a public land mobile network (PLMN) ID.
24. The apparatus of clause 22 or 23, in which the processor causes the apparatus to select the first CGI of the plurality of CGIs in response to determining that a public land mobile network (PLMN) identifier (ID) of the first CGI is a registered PLMN ID or an allowed PLMN ID and a tracking area identity corresponding to the first CGI matches a last used or registered tracking area identity.
25. The apparatus of any of the clauses 22-24, in which the processor causes the apparatus to perform a registration update in response to determining that a tracking area identity list of the cell does not include a registered tracking area identity, or a tracking area identity corresponding to the first CGI does not match the registered tracking area identity.
26. The apparatus of any of the clauses 22-25, in which the first CGI is barred for a period of time in response to the first CGI not matching a registered tracking area identity, and in which the processor causes the apparatus:

to select the first CGI of the plurality of CGIs after the period of time expires; and
to perform a registration update after selecting the first CGI.

27. The apparatus of any of the clauses 22-26, in which the UE is pre-configured to select a physical cell identifier (ID), beam ID, or beam frequency at a given time period.

28. The apparatus of any of the clauses 22-27, in which the UE is pre-configured with timing information for at least one of the plurality of tracking area identities and a public land mobile network (PLMN) identifier (ID) broadcast by the cell.

29. The apparatus of any of the clauses 22-28, in which the processor causes the apparatus:
to receive the plurality of CGIs during a measurement of a neighbor cell; and
to report the measurements of the neighbor cell including a time of reception of each of the plurality of CGIs of the neighbor cell, and at least one CGI of the plurality of CGIs of the neighbor cell selected based on a neighbor rule.

30. The apparatus of any of the clauses 22-29, in which the neighbor rule is based on a current location of the UE, or a location of a satellite associated with the neighbor cell, or a random number.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method for wireless communication performed at a user equipment (UE), comprising:
receiving at least one neighbor cell global identity (CGI) during measuring of a neighbor cell; and
reporting, to a serving cell, the measurement of the neighbor cell and a plurality of tracking area codes of the at least one neighbor CGI, the neighbor cell corresponding to the plurality of tracking area codes.

2. The method of claim 1, further comprising:
identifying a plurality of cell global identities (CGIs) broadcast by a cell;
determining a current tracking area identity of the UE from a plurality of tracking area identities of the cell based on a defined rule;
selecting a first CGI of the plurality of CGIs based on the determined tracking area identity; and
performing a registration update based on the first CGI.

3. The method of claim 2, in which each CGI of the plurality of CGIs is based at least in part on one of the plurality of tracking area identities, a cell identifier (CID), a physical cell identifier (PCID), or a public land mobile network (PLMN) ID.

4. The method of claim 2, wherein the first CGI of the plurality of CGIs is selected when a public land mobile network (PLMN) identifier (ID) of the first CGI is a registered PLMN ID or an allowed PLMN ID and when a tracking area identity corresponding to the first CGI matches a last used or registered tracking area identity.

5. The method of claim 2, further comprising performing a registration update when a tracking area identity list of the cell does not include a registered tracking area identity or when a tracking area identity corresponding to the first CGI does not match the registered tracking area identity.

6. The method of claim 2, in which the first CGI is barred for a period of time in response to the first CGI not matching a registered tracking area identity, and the method further comprises:
re-selecting the first CGI of the plurality of CGIs after the period of time expires; and
performing a registration update after selecting the first CGI.

7. The method of claim 2, in which the defined rule is based on a time period as the cell moves.

8. The method of claim 7, wherein, for cell reselection or cell selection, the first CGI is different from a previously selected CGI based on at least one of:
a physical cell identifier (ID); or at least one of the first CGI or a public land mobile network (PLMN) ID and a tracking area identity associated with the first CGI associated with the physical cell ID.

9. The method of claim 2, further comprising selecting a physical cell identifier (ID), a beam ID, or beam frequency at a given time period to enable the selecting of the first CGI.

10. The method of claim 2, in which the defined rule comprises pre-configured timing information for at least one of the plurality of tracking area identities or a public land mobile network (PLMN) identifier (ID) broadcast by the cell.

11. The method of claim 2, further comprising acquiring system information from the cell to read the first CGI prior to when the first CGI is selected during a cell reselection procedure.

12. The method of claim 2, in which the defined rule is based on a mapping between a current location information of the UE and the first CGI or between the current location information of the UE and a tracking area identity associated with the first CGI.

13. The method of claim 12, in which the current location information of the UE further comprising a distance from the UE to a reference point or a distance from an area of UE presence to the reference point.

14. The method of claim 2, further comprising:
transmitting the current tracking area identity in a registration update message included in a non-access stratum (NAS) message; or
transmitting the current tracking area identity during a radio resource configuration (RRC) setup procedure or in response to a network request.

15. The method of claim 2, further comprising, if the first CGI does not map to a current location of the UE, performing at least one of:
excluding the first CGI during a radio resource configuration (RRC) setup procedure;
transmitting a randomly selected CGI during the RRC setup procedure or in response to a network request,
transmitting a selected CGI based on a last used CGI during the RRC setup procedure or in response to the network request; or
reporting multiple CGIs during the RRC setup procedure or in response to the network request.

16. The method of claim 2, further comprising:
receiving a list of tracking area identities for current cell coverage and future cell coverage; and
receiving an indication for identifying from the list a tracking area identity for the current cell coverage for the registration update.

17. The method of claim 2, in which the defined rule is based on timing information identifying a time period when the cell will cover a tracking area, the method further comprising receiving the timing information in a non-access stratum (NAS) message, a dedicated radio resource control (RRC) message, or a broadcast message.

18. The method of claim 2, further comprising:
receiving a validity time period for a tracking area from a non-access stratum (NAS) message, a dedicated radio resource control (RRC) message or a broadcast message; and
acquiring a system information block (SIB) outside of the validity time period.

19. The method of claim 2, in which the cell corresponds to a coverage area of a non-terrestrial entity.

20. The method of claim 2, in which a current location of the UE or the first CGI is associated with a fixed cell of a terrestrial network, and the method further comprises:
measuring a received signal strength of a set of cells of the terrestrial network or a non-terrestrial network; and
reporting the selected first CGI when the cell broadcasting the selected first CGI has a highest received signal strength during a radio resource control (RRC) setup procedure or in response to a network request.

21. The method of claim 1, in which the reporting is based on a neighbor rule that is based on a current location of the UE, a location of a satellite associated with the neighbor cell, or a random number.

22. The method of claim 1, further comprising reporting the measurement of the neighbor cell along with a time of reception of each of the at least one CGI of the neighbor cell.

23. An apparatus for wireless communications, comprising:
at least one processor;
memory coupled with the at least one processor; and
instructions stored in the memory and operable, when executed by the at least one processor, to cause the apparatus to:
receive at least one neighbor cell global identity (CGI) during a measurement of a neighbor cell; and
report, to a serving cell, the measurement of the neighbor cell and a plurality of tracking area codes of the at least one neighbor CGI, the neighbor cell corresponding to the plurality of tracking area codes.

24. The apparatus of claim 23, in which the at least one processor causes the apparatus:
to identify a plurality of cell global identities (CGIs) broadcast by a cell;
to determine a current tracking area identity of the apparatus from a plurality of tracking area identities of the cell based on a defined rule;
to select a first CGI of the plurality of CGIs based on the determined tracking area identity; and
to perform a registration update based on the first CGI.

25. The apparatus of claim 24, in which each CGI of the plurality of CGIs is based at least in part on one of the plurality of tracking area identities, a cell identifier (CID), a physical cell identifier (PCID), or a public land mobile network (PLMN) ID.

26. The apparatus of claim 24, in which the at least one processor causes the apparatus to select the first CGI of the plurality of CGIs in response to determining that a public land mobile network (PLMN) identifier (ID) of the first CGI is a registered PLMN ID or an allowed PLMN ID and a tracking area identity corresponding to the first CGI matches a last used or registered tracking area identity.

27. The apparatus of claim 24, in which the at least one processor causes the apparatus to perform a registration update in response to determining that a tracking area identity list of the cell does not include a registered tracking area identity, or a tracking area identity corresponding to the first CGI does not match the registered tracking area identity.

28. The apparatus of claim 24, in which the first CGI is barred for a period of time in response to the first CGI not matching a registered tracking area identity, and in which the at least one processor causes the apparatus:
to select the first CGI of the plurality of CGIs after the period of time expires; and
to perform a registration update after selecting the first CGI.

29. The apparatus of claim 24, in which the apparatus is pre-configured to select a physical cell identifier (ID), beam ID, or beam frequency at a given time period.

30. The apparatus of claim 24, in which the apparatus is pre-configured with timing information for at least one of the plurality of tracking area identities and a public land mobile network (PLMN) identifier (ID) broadcast by the cell.

31. A user equipment (UE), comprising:
- at least one transceiver;
- at least one processor coupled to the at least one transceiver;
- memory coupled with the at least one processor; and
- instructions stored in the memory and operable, when executed by the at least one processor, to cause the UE to:
- receive, via the at least one transceiver, at least one neighbor cell global identity (CGI) while measuring a neighbor cell; and
- report, via the at least one transceiver to a serving cell, measurements of the neighbor cell and a plurality of tracking area codes of the at least one neighbor CGI, the neighbor cell corresponding to the plurality of tracking area codes.

* * * * *